(12) United States Patent
Hurdle

(10) Patent No.: US 10,189,216 B2
(45) Date of Patent: Jan. 29, 2019

(54) PROCESS AND APPARATUS FOR MOLDING COMPOSITE ARTICLES

(71) Applicant: Eric Hurdle, Repentigny (CA)

(72) Inventor: Eric Hurdle, Repentigny (CA)

( * ) Notice: Subject to any disclaimer, the term of this patent is extended or adjusted under 35 U.S.C. 154(b) by 1451 days.

(21) Appl. No.: 14/359,021

(22) PCT Filed: Nov. 19, 2012

(86) PCT No.: PCT/CA2012/001069
§ 371 (c)(1),
(2) Date: May 16, 2014

(87) PCT Pub. No.: WO2013/071422
PCT Pub. Date: May 23, 2013

(65) Prior Publication Data
US 2014/0327187 A1    Nov. 6, 2014

Related U.S. Application Data

(60) Provisional application No. 61/561,521, filed on Nov. 18, 2011.

(51) Int. Cl.
| | | |
|---|---|---|
| *B29C 35/02* | (2006.01) | |
| *B29C 37/00* | (2006.01) | |
| *B29C 70/44* | (2006.01) | |
| *B29C 70/48* | (2006.01) | |
| *B29C 70/54* | (2006.01) | |

(52) U.S. Cl.
CPC .......... *B29C 70/44* (2013.01); *B29C 37/0064* (2013.01); *B29C 70/443* (2013.01); *B29C 70/48* (2013.01); *B29C 70/54* (2013.01); *B29C 35/0261* (2013.01)

(58) Field of Classification Search
CPC ........ B29C 35/0261; B29C 2043/3636; B29C 65/08; B29C 65/645; B29C 65/7443; B29C 70/44; B29C 37/0064; B29C 70/443; B29C 70/54; B29C 70/48
USPC .................................................. 264/407, 442
See application file for complete search history.

(56) References Cited

U.S. PATENT DOCUMENTS 4,288,398 A * 9/1981 Lemelson ............... B21C 31/00
264/443
4,388,129 A * 6/1983 Oizumi ............... B29C 37/0064
156/73.1

(Continued)

*Primary Examiner* — Jeffrey M Wollschlager

(57) ABSTRACT

A method and an apparatus for molding composite articles are disclosed. The method generally involves the saturation of reinforcing fibers (e.g. glass fibers, carbon fibers, etc.) with a matrix (e.g. resin, epoxy, cyanate ester, vinyl ester, polyester, etc.) in/on a mold using a conventional resin transfer molding ("RTM") process (e.g. "RTM-light") or a vacuum assisted resin transfer molding ("VARTM") process (e.g. advanced VARTM or "A-VARTM"), and, once saturation is completed, the vibration of the matrix-infused fibers using controlled ultrasonic sound waves transmitted through the mold. By vibrating the matrix-infused fibers with the ultrasonic sound waves, the method and apparatus allow voids present between fibers to be closed and localized pockets of gases to be dislodged and degassed, and also allow the fibers to compact, thereby producing composite articles with reduced porosity and higher compaction.

22 Claims, 4 Drawing Sheets

(56) References Cited

U.S. PATENT DOCUMENTS

| | | | | |
|---|---|---|---|---|
| 4,548,771 | A * | 10/1985 | Senapati | B29C 35/0261 |
| | | | | 156/73.1 |
| 4,779,452 | A * | 10/1988 | Cohen-Tenoudji | G01N 11/00 |
| | | | | 73/54.41 |
| 4,921,415 | A * | 5/1990 | Thomas | B06B 1/067 |
| | | | | 264/407 |
| 5,009,104 | A * | 4/1991 | Johnson | G01N 29/11 |
| | | | | 264/257 |
| 5,888,645 | A * | 3/1999 | Lindgaard | B29C 35/0261 |
| | | | | 264/442 |
| 6,033,203 | A * | 3/2000 | Christensen | B29C 35/0261 |
| | | | | 425/174.2 |
| 6,183,834 | B1 * | 2/2001 | van der Loo | B29C 70/30 |
| | | | | 264/241 |
| 6,270,714 | B1 * | 8/2001 | Azran | B01D 53/22 |
| | | | | 264/328.1 |
| 2002/0020934 | A1 * | 2/2002 | Hinz | B29C 70/443 |
| | | | | 264/40.6 |
| 2003/0132543 | A1 * | 7/2003 | Gardner | B29C 70/443 |
| | | | | 264/85 |
| 2005/0037678 | A1 * | 2/2005 | Mack | B29C 70/443 |
| | | | | 442/1 |
| 2005/0086916 | A1 * | 4/2005 | Caron | B29C 43/12 |
| | | | | 55/382 |
| 2008/0315462 | A1 * | 12/2008 | Batzinger | G01B 17/02 |
| | | | | 264/407 |
| 2010/0244327 | A1 * | 9/2010 | Byrd | B01J 3/006 |
| | | | | 264/443 |
| 2012/0040106 | A1 * | 2/2012 | Simmerer | B29B 15/122 |
| | | | | 427/560 |
| 2013/0009348 | A1 * | 1/2013 | Murata | B28B 19/00 |
| | | | | 264/642 |
| 2013/0127092 | A1 * | 5/2013 | Dauner | B29C 44/1228 |
| | | | | 264/415 |

* cited by examiner

PROCESS AND APPARATUS FOR MOLDING COMPOSITE ARTICLES

CROSS-REFERENCE TO RELATED APPLICATIONS

The present patent application claims the benefits of priority of U.S. Provisional Patent Application No. 61/561,521, entitled "Apparatus and Method for the Controlled Ultrasonic Resin Infusion of Composite Articles" and filed at the United States Patent and Trademark Office on Nov. 18, 2011, the content of which is incorporated herein by reference.

FIELD OF THE INVENTION

The present invention generally relates to the field of resin transfer molding ("RTM") processes and vacuum assisted resin transfer molding ("VARTM") processes used for molding composite articles, and more particularly relates to advanced vacuum assisted resin transfer molding ("A-VARTM") processes.

BACKGROUND OF THE INVENTION

There are many industries producing fiber-reinforced resin composite parts. For instance, composite parts are commonly used in the automotive, marine, industrial, and aerospace industries.

Depending on the requirements of each industry, various methods and processes can be used to produce composite parts. One commonly known method is the resin transfer molding ("RTM") process in which reinforcing materials (e.g. glass fibers, carbon fibers, etc.) are placed into a closed mold and then impregnated at high pressure (e.g. 400 psi and higher) with a liquid matrix (e.g. a polymer resin). In a variant of the RTM process, the closed mold is put under vacuum prior to the injection, at atmospheric pressure, of the matrix to impregnate the reinforcing materials. Such a process is generally known as a vacuum assisted resin transfer molding ("LIGHT RTM") or ("VARTM") process. In line with the VARTM process is the advanced VARTM ("A-VARTM") process. In A-VARTM process, the mold is usually open and light weight compared to other RTM or VARTM processes. To compress the layers of reinforcement materials on a complex mold shape, a flexible vacuum bag is used. When the bag is put under vacuum, the atmospheric pressure insures the proper compaction of the reinforcing materials and removes air in the bag. After impregnation of the reinforcing fibers with the matrix, the pressure on the bag becomes neutral and degassing become difficult.

One of the problems of composite parts made from VARTM processes is the porosity. Indeed, despite due care, the impregnation of the reinforcing materials with the matrix is never perfect and the resulting composite part typically contains porosities such as voids and gas bubbles around fibers and in the matrix. Though porosities are generally not a major problem in the automotive and marine industries, they are a significant problem for the aerospace industry. Indeed, in the aerospace industry, the porosity content of a composite part must be severely controlled to prevent its failure.

Unfortunately, current RTM, VARTM, even A-VARTM processes are not able to produce composite parts with the requisite limited amount of porosities suitable for the aerospace market.

To overcome the shortcomings of VARTM processes, the aerospace industry currently produces composite parts using a specific process, sometimes referred to as pre-preg, using reinforcing materials pre-impregnated with a resin matrix and ready to be vacuum bagged and cured at high temperature (e.g. 130° C. and higher) in a pressurized autoclave. The main advantage of autoclaved pre-impregnated composite parts is the almost complete absence of voids and porosities (typically less than 1%). However, the pre-impregnated process is excessively expensive. For instance, pre-impregnated reinforcing materials must be stored at −18° C. or colder to slowdown the cure cycle of pre-mixed resin, they have to be thawed many hours before usage and they need significant supervision. In addition, the pre-impregnated process requires a pressurized autoclave which is very expensive, particularly for large composites parts.

Hence, there is a need for an improved A-VARTM process and associated molding apparatus which could mitigate at least some shortcomings of prior art VARTM processes and which could be able to produce composite parts and articles with a porosity level similar or better to the pre-impregnated process.

SUMMARY OF THE INVENTION

The shortcomings of prior art methods and processes for molding composite articles using RTM, VARTM, or A-VARTM processes are at least mitigated by submitting the resin-infused reinforcing materials to ultrasonic sound waves.

Hence, a typical process to produce resin-infused composite articles in accordance with the principles of the present invention generally comprises the placement of reinforcing materials (e.g. glass fibers, carbon fibers, etc.) in or on a mold, the infusion, typically under vacuum, of the reinforcing materials with a matrix (e.g. a resin), and, once the infusion is completed and before the end of gel time, the transmission of controlled ultrasonic sound waves to the resin-infused reinforcing materials through the mold.

For its part, a molding apparatus in accordance with the principles of the present invention generally comprises a mold having a molding surface, and an infusion vacuum bag configured to cover the reinforcing materials during the infusion and apply pressure thereon. In accordance with the principles of the present invention, the mold comprises at least one though typically several ultrasound transducers mounted to the mold and/or embedded within its thickness.

The ultrasonic sound waves are used to vibrate the reinforcing materials via the mold when their reinforcing fibers are saturated with resin. By vibrating the reinforcing materials, it is possible to eliminate or at least significantly reduce voids and bubbles present in and around the resin-infused reinforcing materials and thereby reduce the level of porosity in the final molded composite article and getting a better compaction of the fibers.

Since RTM, VARTM, A-VARTM processes can be used with different types of polymer resin matrices, reinforcing materials, and molds, the mold will typically comprises different ultrasonic transducers typically able to operate at different frequency ranges. The choice of the ultrasonic transducers will typically be based on the type of matrices and reinforcing materials used, and on the mold types and shapes. In addition, the position of each of the transducers on or embedded in the mold is typically determined to provide proper vibration of the resin-infused reinforcing materials.

In typical yet non-limitative embodiments, various ultrasonic frequency ranges are used to vibrate the resin-infused reinforcing materials. In some of these embodiments, the different ultrasonic frequency ranges can be transmitted at different times according to a predetermined sequence, and/or at different levels of power. For instance, high frequency ultrasonic sound waves (e.g. 170 kHz to 200 kHz, at 25 W) could be transmitted to generally vibrate the reinforcing fibers and thus close voids present between fibers, followed, or preceded, by low frequency ultrasonic sound waves (e.g. 27 kHz to 40 kHz, at 25 W) to fill and/or fraction bubbles present in the resin. Other ultrasonic frequencies can however be used.

In typical yet non-limitative embodiments, the vacuum bag of the molding apparatus comprises additional degassing vacuum ports strategically positioned on the bag (depending on the shape and size of the mold) for maximizing local degassing and specific bleeding of matrix used in the process.

Notably, the process and related molding apparatus in accordance with the principles of the present invention allow the molding of composite articles and parts having a much higher compaction of fibers due to the vibration of the reinforcing fibers when saturation is completed, i.e. when the reinforcing material fibers are wet (notably, dry fibers would damp vibrations and not provide results). Using such a process and its related molding apparatus, the ratio matrix/fibers potential (e.g. 70% and higher) can be very high without creating dry spots, allowing the manufacturing of composite articles and parts which meet the stringent porosity level and high ratio of matrix/reinforcement fiber of the aerospace industry at a much lower cost than pre-impregnated or pre-preg processes.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel process and related apparatus for molding composite articles will be described hereinafter. Although the invention is described in terms of specific illustrative embodiments, it is to be understood that the embodiments described herein are by way of example only and that the scope of the invention is not intended to be limited thereby.

Figure 1:
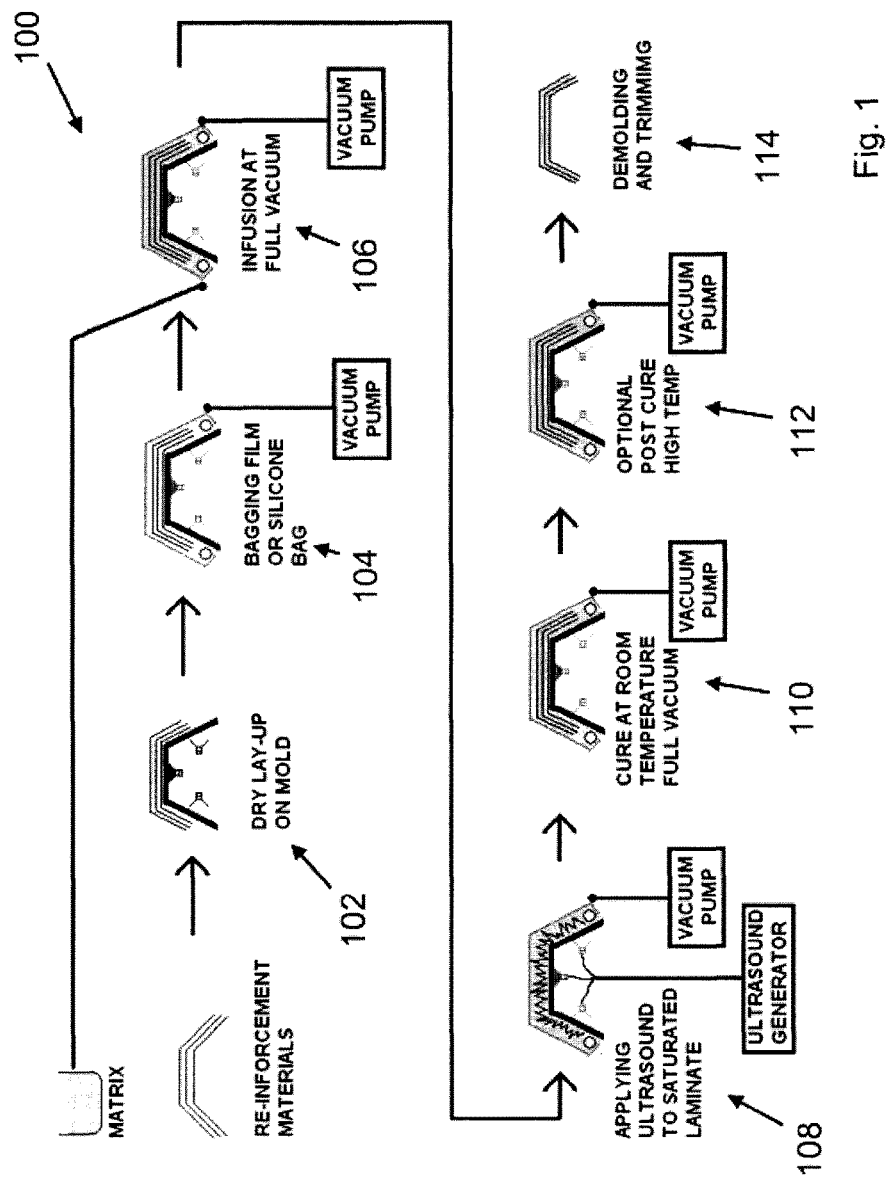
FIG. 1 is schematic flow-chart of a process for molding composite articles in accordance with the principles of the present invention.

Referring first to FIG. 1, a flow-chart depicting an embodiment of a process 100 to mold composite articles in accordance with the principles of the present invention is shown.

In the present embodiment, the process 100 is mostly based on a A-VARTM process. Hence, the process 100 typically comprises the placement of reinforcing materials on a mold which is in the shape of the desired article (at 102). In the present embodiment, several types of reinforcing materials can be used. For instance, glass fibers, carbon fibers, glass fiber fabric, carbon fiber fabric, etc.

Next, once the reinforcing materials are properly positioned on the mold, a vacuum bag (or vacuum film) is disposed over the reinforcing materials, a vacuum pump is connected to the vacuum port of the bag and a matrix source is connected to the matrix port (at 104). At this point, the molding apparatus is ready for the injection of the matrix.

Then, the vacuum pump is turned on to create a full vacuum (e.g. ~25 in Hg or higher) in the vacuum bag. Understandably, as the vacuum is created inside the vacuum bag, atmospheric pressure will press the bag against the reinforcing material. At the same time, the resin matrix is introduced into the bag via the matrix port for infusing the reinforcing materials (at 106).

Understandably, as the matrix is introduced in the bag under vacuum, the matrix will tend to fill most of the empty areas and voids in and around the reinforcing materials.

Once the reinforcing materials is properly infused and saturated with resin, ultrasonic sound waves are transmitted to the resin-infused reinforcing materials (also referred to as a laminate) through the mold (at 108). Some of the high-frequency ultrasonic sound waves will cause the vibration of the fibers of the reinforcing materials, allowing voids which naturally occur between fibers to be closed, thereby increasing the overall the compaction of the laminate. Also, some low-frequency ultrasonic sound waves will cause gas bubbles to be filled-up and/or fractioned to be ultimately degassed by the vacuum and degassing port(s).

As it will be described in more details below, in the present embodiment, the ultrasonic sound waves can be transmitted at different frequencies and/or power levels according to one or more predetermined sequences.

After the transmission of the ultrasonic sound waves, the laminate is left to cure at room temperature for a predetermined amount of time (at 110). In the present embodiment, the curing of the laminate is performed under vacuum.

Optionally, the laminate can be subjected to a high-temperature post cure to generally improve the thermal and mechanical properties of the laminate (at 112).

Finally, the laminate is demolded and trimmed or machined to remove excess materials and/or other surface imperfections (at 114). The laminate is then a finished composite article or part.

Figure 2:
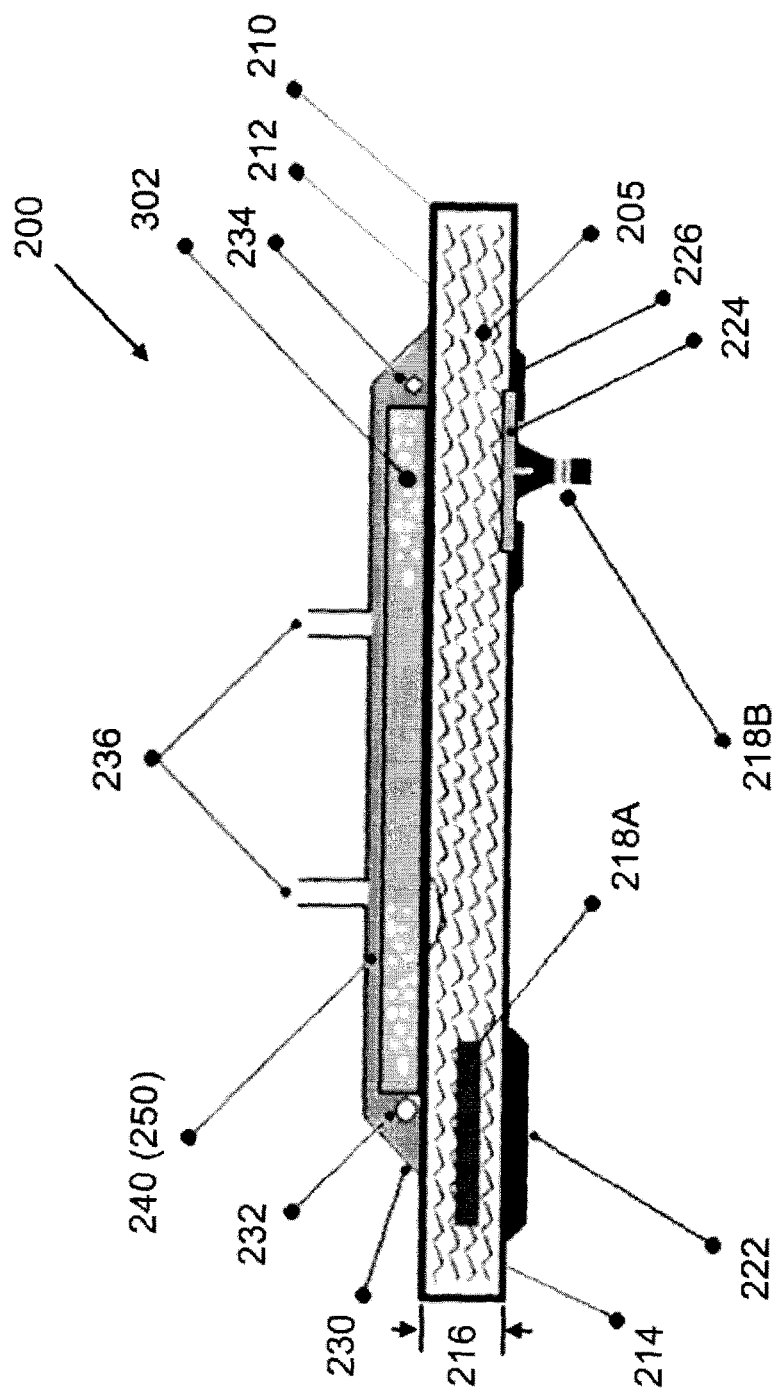
FIG. 2 is a cross-sectional side view of a molding apparatus for molding composite articles in accordance with the principles of the present invention.
Figure 2A:
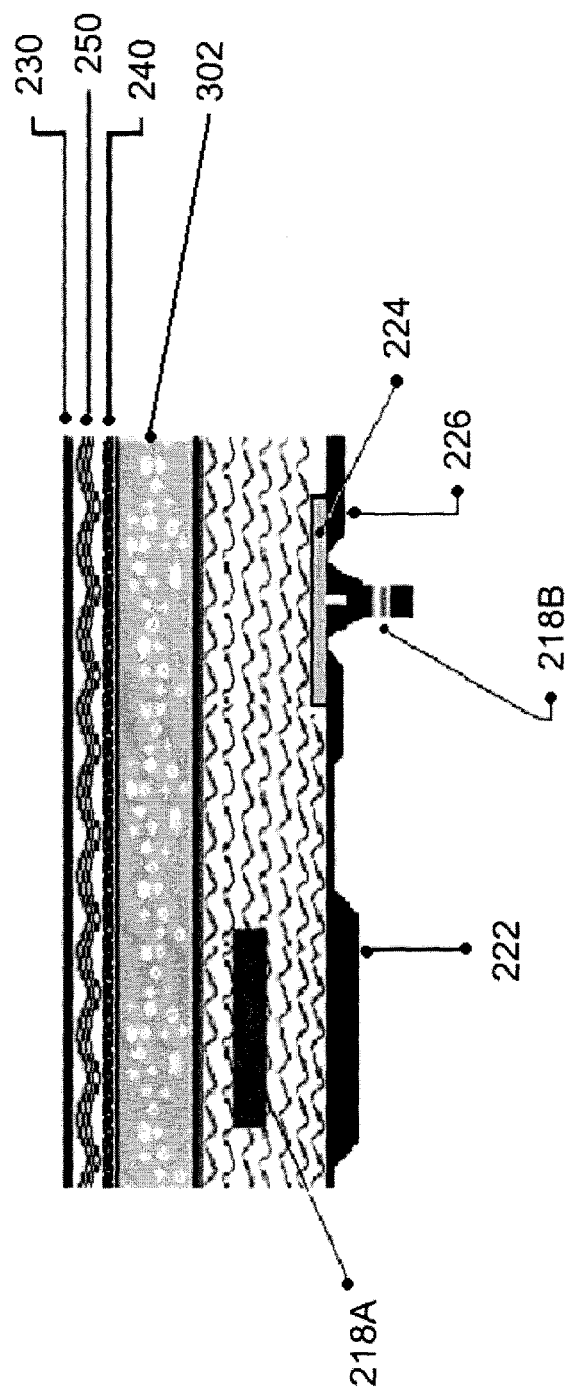
FIG. 2A is an enlarged partial cross-sectional side view of the molding apparatus of FIG. 2.

Referring now to FIGS. 2 and 2A, an embodiment of a molding apparatus 200 to enable the molding process is depicted. The apparatus 200 typically comprises a mold 210, typically made of composite material or metallic material, and a vacuum bag 230 typically made from a thin silicone membrane or nylon bagging film (e.g. Airtech Wrightlon 5400).

In the present embodiment, to provide a uniform rough surface finish on the bag side of the molded composite part, a nylon peel ply 240 (e.g. Airtech econostitch) is disposed over the reinforcing materials 302 prior to the installation of the vacuum bag 230. Also, in the present embodiment, an infusion media layer 250 (e.g. Airtech green flow 75) is disposed between the peel ply 240 and the vacuum bag 230 to allow the resin matrix to freely flow during its injection (see FIG. 2A).

As shown in FIG. 2, the mold 210 comprises a top surface 212 and a bottom surface 214 defining a thickness 216. The top surface 212 provides a molding surface for receiving the reinforcing materials 302. Understandably, the top surface 212 of the mold 210 is generally in the shape of the article or part to be molded. Hence, the top surface 212 is shown as flat for illustration purpose only.

For its part, the vacuum bag 230 comprises at least one resin inlet port 232 allowing the resin to enter in the bag 230 during the infusion of the reinforcing materials 302, and at least one vacuum outlet port 234 allowing a vacuum to be created inside the bag 230 prior and during the infusion. The vacuum outlet port 234 is typically connected to a vacuum source (e.g. ~25 in Hg or higher) such as a vacuum pump (not shown). Understandably, when a vacuum is created inside the bag 230 which is made from flexible material, the bag 230 collapses and applies pressure on the resin-infused reinforcing materials 302.

To allow the removal of air and other gas bubbles around the fibers and from the resin-infused reinforcing materials 302, the vacuum bag 230 comprises at least one though typically several degassing vacuum outlet ports 236. Typically, these degassing vacuum outlet ports 236 are strategically positioned on the vacuum bag 230 to provide proper degassing of the resin-infused reinforcing materials 302. Local degassing ports allow to degas specific area(s) or region(s) and also allow to bleed extra matrix at specific location(s) to reach a maximum of fiber volume fraction (ratio fiber/resin) without creating dry spots.

To prevent the vacuum bag 230 from leaving a shinny finish and/or from adhering on the resin-infused reinforcing materials 302 during the molding process, the layer of peel ply cloth 240 is disposed on reinforcement material 302 between the media fusion layer 250 and resin-infused reinforcing materials 302. This cloth 240 is typically removed once the cure and/or post cure of the part is completed.

Also shown in FIG. 2, in accordance with the principles of the present invention, the mold 210 comprises at least one ultrasonic sound wave transducer 218 mounted to its bottom surface 214 or embedded into its thickness 216. In FIG. 2, two transducers 218 are shown. Embedded transducers such as transducer 218A are typically used for thin composite parts (e.g. ~0.0125") whereas surface-mounted transducers such as transducer 218B are typically used for thicker composite parts (e.g. 0.0125" up to 0.500").

Embedded transducers are typically piezoelectric transducers made of ceramic flat disk. Such transducers are typically custom made by APC International, Ltd.

Surface-mounted transducers are typically Langevin type transducers. Such transducers are typically made of an aluminum base and a head made of two bonded piezo-disks. Such transducers are made, for instance, by Cleaning Technologies Group (Blackstone-NEY Ultrasonics).

As shown in FIG. 2, in the present embodiment of the molding apparatus 200, the region 222 of the bottom surface 214 located underneath the embedded transducer 218A is made thicker. By making the region 218 thicker (typically about the thickness of the transducer 218A), the vibrations 205 generated by the transducer 218A which travel downwardly and away from the resin-infused reinforcing materials 302, are at least partially reflected back toward the resin-infused reinforcing materials. Hence, the thicker region 222 typically reduces energy losses.

Also, in the present embodiment of the molding apparatus 200, the surface-mounted transducer 218B is mounted (e.g. bond or bolted) to a metallic plate 224 (e.g. an aluminum plate) itself mounted to the bottom surface 214 of the mold 210. Such plate 224 is used to avoid the mounting of the transducer directly to the mold 210 and to allow the easy replacement of the transducer 218B if necessary. In addition, in a manner similar to region 222, the region 226 around the plate 224 is also typically made thicker (about the thickness of the plate 224).

Understandably, the transducers 218 are connected to an ultrasound generator (not shown). An ultrasound generator that has provided satisfactory results is the Multisonic 40-80-120-140-170-220-270-MSG2-12 t2-230V made by Blackstone-NEY Ultrasonics.

To promote the vibration of the fibers of the reinforcing materials and to allow the bubbles to collapse or fraction, sequences of ultrasounds are typically transmitted.

An exemplary sequence that has shown satisfactory results is a follows: 40 kHz for about 15 seconds, 170 kHz for about 15 seconds, 40 kHz for about 10 seconds, 200 kHz for about 5 seconds, 170 kHz for about 15 seconds, and so on as needed. Understandably, different resin matrix, reinforcing materials and mold shapes might warrant different sequences, different duration, different power levels and/or different frequencies.

When high frequencies are used (e.g. 170 kHz to 200 kHz), the heat produced by the vibration of the fibers has shown to reduce the gel time significantly if used too often (e.g. for more than 60 seconds straight). Depending on the matrix and reinforcing materials used, frequency sequences and time exposure will change.

Figure 3:
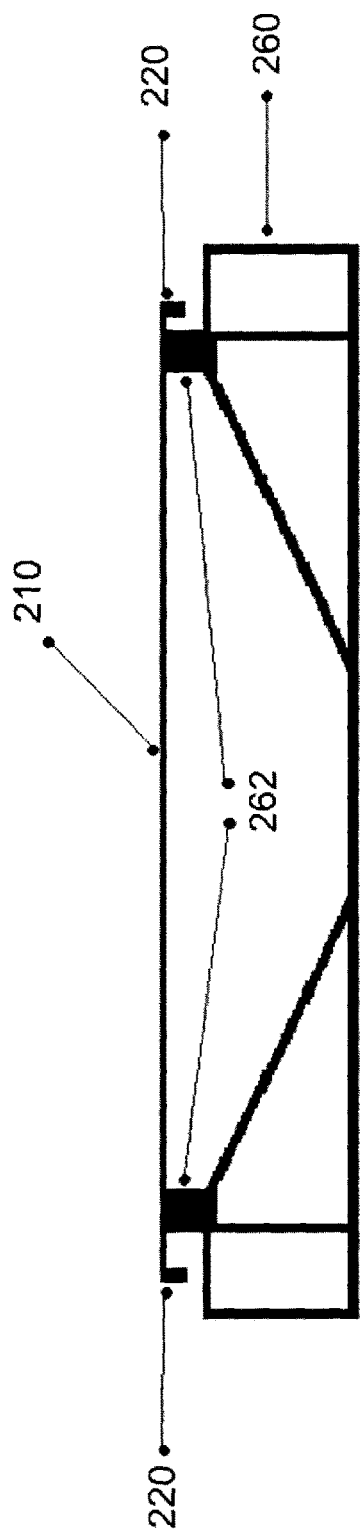
FIG. 3 is a cross-sectional side view of the mold of the molding apparatus of FIG. 2, mounted to a support frame.

Since the ultrasonic sound waves transmitted to the resin-infused reinforcing materials are effectively transmitted through the mold 210, it is advantageous to have the mold 210 able to freely vibrate in order to benefit, among other things, from constructive interferences between the main vibrations and the returning ones. Using constructive interferences can allow the use less powerful sources of ultrasounds. To allow the mold 210 to vibrate, it can be suspended on a frame 260 via passive suspension elastomeric vibration isolator 262 (e.g. Newport Vibration-Isolator). FIG. 3 shows an example of the mold 210 suspended on the frame 260 via the suspensions (or isolators) 262. For a range of ultrasounds frequencies of 40 to 200 kHz, it has been found that the suspension 262 can be also made of a hard rubber, e.g. of 50 to 70 Shore or can be a mini air suspension.

In the present embodiment, the edges 220 of the mold 210 are thicker than the thickness 216 of the mold 210, typically about twice as thick. The thicker edges 220 allow the vibrations moving outwardly to be reflected back inwardly, thereby preventing or at least reducing energy losses.

When the mold 210 vibrates, standing waves will likely occur and have the advantage of high amplitude resulting from constructive interferences. However, the stationary status of these standing waves can also create patterns of porosity since some regions of the resin-infused reinforcing materials 302 may vibrate more, or less, than other regions.

In order to prevent stationary standing waves, displacement of the standing waves can be achieved by a sweeping frequencies produced by the ultrasound generator. For instance, sweeping lower frequencies will help move the standing waves by creating disturbance.

Typically, the ultrasonic sound waves will not shake the mold 210 but will travel through the mold 210 and only vibrate the resin-infused reinforcing materials 302. Notably, it has been found that the amount of power needed to properly vibrate the resin-infused reinforcing materials 302 will be lowered if the vibrations are chosen to match the natural resonance frequency of the mold 210. If the vibrations are not chosen to match the natural resonance frequency of the mold 210, more power may be necessary and the performances would possibly be affected.

The natural resonance frequency of the mold 210 can be obtained via different methods. One method involves the use of a laser interferometer. In such method, the mold 210 is suspended and then knocked at the location where the transducer 218 is intended to be installed. Then the mold 210 is let vibrating and the vibration pattern is measured with the interferometer. The position of the transducer 218 can then be fine-tuned in order to obtain the desired vibration pattern. The method is then repeated for each transducer 218 to obtain proper match and coverage performances.

With the proper equipment selected and installed on the molding apparatus, the process will provide satisfactory results.

Below is an example of a process performed in accordance with the principles of the present invention.

First, the mold surface is prepared with a liquid release agent (e.g. Zyvax) and vacuum bag sealant tape (e.g. Airtech AT200Y) is applied on the flanges of the mold.

Then, the reinforcing material plies are laid-up directly on the mold surface and the peel ply layer, the media infusion layer and the vacuum bag are sequentially disposed over the reinforcing material plies. The vacuum bag is connected to the resin matrix source and to the vacuum pump.

Then, the vacuum pump is turned on to create the vacuum inside the vacuum bag. Several checks are typically performed to make sure that there are no leaks.

At this point, the resin matrix is injected into the mold via the vacuum bag to infuse the reinforcing material plies. As soon as the reinforcing material plies are thoroughly saturated with resin matrix, the transmission of ultrasonic sound waves is started.

At first, low frequency ultrasounds (e.g. about 40 kHz) and high frequency ultrasounds (e.g. about 170 kHz-200 kHz should be the maximum range) are alternatively transmitted for about 10 to 15 seconds each to chase voids and bubbles. During the transmission of the ultrasounds, larger bubbles are going to surface and be degassed while microscopic bubbles are going to be fractioned into still smaller bubbles or will agglutinated together into larger bubbles and be degassed.

At this point, one or more of the degassing ports are slightly opened to allow localized zone(s) (e.g. sharp corners) to evacuate gases. However, it is important to prevent the resin matrix to flow into the degassing ports.

Once the resin matrix no longer shows signs of degassing, the ultrasound transmission cycle is modified so that the high frequency ultrasounds (e.g. about 170 kHz) are transmitted for a longer period, about 15 to 25 seconds, and the low frequency ultrasounds (e.g. about 40 kHz) are transmitted for a shorter period of time, about 5 to 10 seconds.

The modified cycle is used to vibrate the fibers of the reinforcing material plies and keep degassing. In that sense, there will typically be traces of degassing at the surface of the resin matrix when the fibers move and compact and cause microscopic bubbles surrounding the fibers to detach.

Then, again, one or more of the degassing ports are slightly opened to allow the evacuation of the gases. When the degassing ports are opened, it is important to prevent the resin matrix to flow in them.

When the degassing is completed, the resin matrix can be bled if needed. To do so, the degassing vacuum ports are gently opened to allow some resin matrix to fill the tubes (about 1% of the total extra resin matrix) and then closed to allow the resin matrix to flow in dryer spots and equilibrate. This operation can be repeated as needed. Notably, the amount of extra matrix allowed in the degassing vacuum ports tubes should be calculated at the beginning of the infusion process and collected in the tubes or in a catch pot if the quantity is large. The resin matrix should be left to equilibrate for a period of time (e.g. 30 seconds) after the last bleeding cycle before turning off the ultrasounds.

Understandably, the matrix used in the above process should have a long enough gel time to allow the different steps of the process to be performed properly. In that sense, when the fibers of the reinforcing material plies vibrate because of the ultrasounds, they absorb an important quantity of energy which is released in part as heat. This heat can cause the gel time of the matrix to be affected, sometimes significantly.

Notably, once the gelation of the resin matrix has begun, the transmission of ultrasounds shall stop to prevent irreversible fractures of the matrix and/or of the reinforcement fibers. Understandably, a hardened matrix will resist vibrations and could present micro fragmentations which will affect the structural integrity of the finished composite article or part.

Once the process is well controlled, some steps could be made with the assistance of a computer.

By using a molding apparatus and executing a process in accordance with the principles of the present invention, it is possible to eliminate or at least significantly reduce the void content and porosity while the matrix is in liquid phase. Composite parts and articles made with a molding apparatus and a process in accordance with the principles of the present invention are of very high quality (e.g. aerospace-grade) and can compare with composite parts and articles made using prepreg in an autoclave.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A process for molding a composite article, the process comprising:
   placing reinforcing materials in or on a mold;
   infusing the reinforcing materials with a matrix until the matrix-infused reinforcing materials are saturated with the matrix;
   starting transmitting ultrasounds to the matrix-infused reinforcing materials when the matrix-infused reinforcing materials are saturated with the matrix, wherein the ultrasounds comprise ultrasounds in a first range of frequencies and ultrasounds in a second range of frequencies than the first range of frequencies;
   stopping transmitting ultrasounds to the matrix-infused reinforcing materials before the matrix begins gelation.

2. The process as claimed in claim 1, wherein the ultrasounds in the first range of frequencies and the ultrasounds in the second range of frequencies are transmitted according to a predetermined sequence.

3. The process as claimed in claim 1, wherein the ultrasounds are transmitted through the mold.

4. The process as claimed in claim 1, wherein the mold comprises at least one ultrasound transducer mounted thereto or embedded therein.

5. The process as claimed in claim 1, wherein the process further comprises placing the reinforcing materials under vacuum prior to infusing the reinforcing materials with the matrix.

6. The process as claimed in claim 1, wherein the process further comprises placing a vacuum bag over the reinforcing materials and creating a vacuum between the vacuum bag and the mold.

7. The process as claimed in claim 6, wherein a peel ply layer is placed between the reinforcing materials and the vacuum bag.

8. The process as claimed in claim 7, wherein an infusion media layer is placed between the peel ply layer and the vacuum bag.

9. The process as claimed in claim 6, wherein the process further comprises degassing at least one region of the matrix-infused reinforcing materials via at least one degassing port located on the vacuum bag.

10. The process as claimed in claim 6, wherein the process further comprises degassing several regions of the matrix-infused reinforcing materials via several degassing ports located on the vacuum bag.

11. A vacuum assisted resin transfer molding process for molding a composite article in a mold, the process comprising:
placing reinforcing materials in or on the mold;
while the reinforcing materials are under vacuum:
infusing the reinforcing materials with a resin until the resin-infused reinforcing materials are saturated with the resin;
starting transmitting ultrasounds to the resin-infused reinforcing materials when the resin-infused reinforcing materials are saturated with the resin, wherein the ultrasounds comprise ultrasounds in a first range of frequencies and ultrasounds in range of frequencies higher then the flat range of frequencies;
stopping transmitting ultrasounds to the resin-infused reinforcing materials before the resin begins gelation.

12. The vacuum-assisted resin transfer molding process as claimed in claim 11, wherein the ultrasounds in the first range of frequencies and the ultrasounds in the second range of frequencies are transmitted according to a predetermined sequence.

13. The vacuum-assisted resin transfer molding process as claimed in claim 11, wherein the ultrasounds are transmitted through the mold.

14. The vacuum-assisted resin transfer molding process as claimed in claim 11, wherein the mold comprises at least one ultrasound transducer mounted thereto or embedded therein.

15. The vacuum-assisted resin transfer molding process as claimed in claim 11, wherein the process further comprises degassing at least one region of the resin-infused reinforcing materials.

16. The process as claimed in claim 1, wherein the ultrasounds in the first range of frequencies and the ultrasounds in the second range of frequencies are transmitted at different times according to a predetermined sequence.

17. The process as claimed in claim 1, wherein the ultrasounds in the first range of frequencies and the ultrasounds in the second range of frequencies are transmitted at different power levels according to a predetermined sequence.

18. The process as claimed in claim 6, wherein the process further comprises bleeding at least one region of the matrix-infused reinforcing materials via at least one degassing port located on the vacuum bag.

19. The process as claimed in claim 6, wherein the process further comprises bleeding several regions of the matrix-infused reinforcing materials via several degassing ports located on the vacuum bag.

20. The vacuum-assisted resin transfer molding process as claimed in claim 11, wherein the ultrasounds in the first range of frequencies and the ultrasounds in the second range of frequencies are transmitted at different times according to a predetermined sequence.

21. The vacuum-assisted resin transfer molding process as claimed in claim 11, wherein the ultrasounds in the first range of frequencies and the ultrasounds in the second range of frequencies are transmitted at different power levels according to a predetermined sequence.

22. The vacuum-assisted resin transfer molding process as claimed in claim 11, wherein the process further comprises bleeding at least one region of the resin-infused reinforcing materials.

* * * * *